Patented July 14, 1936

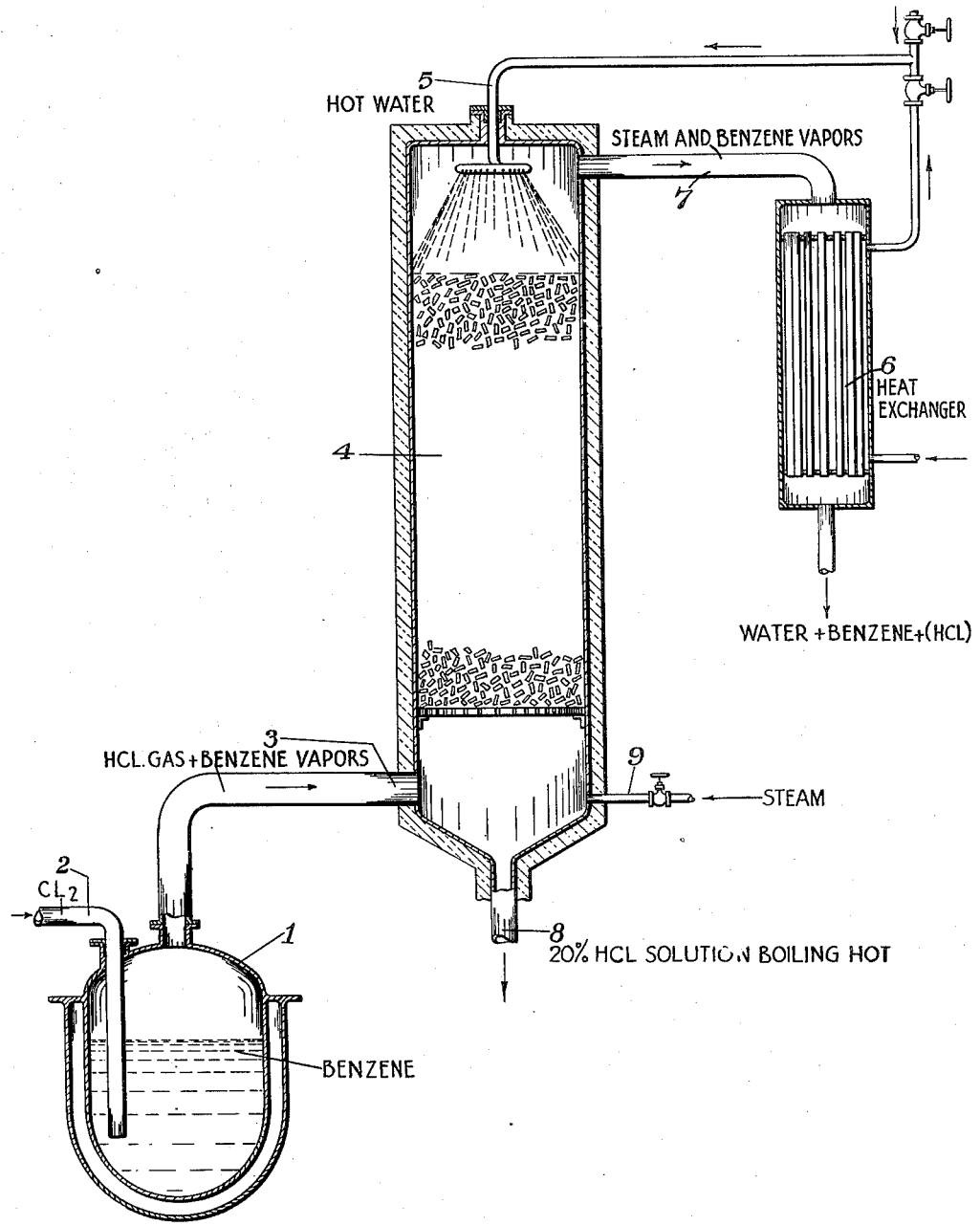

2,047,611

UNITED STATES PATENT OFFICE 2,047,611

MANUFACTURE OF HYDROCHLORIC ACID

John Philip Baxter, Widnes, England, assignor to Imperial Chemical Industries Limited, a corporation of Great Britain Application October 7, 1933, Serial No. 692,699
In Great Britain October 7, 1932

2 Claims. (Cl. 260—154)

This invention relates to improvements in the manufacture of hydrochloric acid evolved in organic reactions, and more particularly refers to a process for removing impurities from hydrogen chloride evolved in organic reactions including esterifications, especially those reactions wherein chlorine is added to hydrocarbons.

Since this process is particularly adapted to the purification of hydrogen chloride evolved in the chlorination of hydrocarbons the prior art will now be discussed using this type of reaction as an example. When hydrocarbons, for instance benzene or naphthalene, are chlorinated it is well known that considerable amounts of hydrogen chloride are evolved. It was customary to absorb this evolved hydrogen chloride in the ordinary types of absorption apparatus, hydrochloric acid similar in strength to that produced in the salt cake process or by the direct combination of chlorine and hydrogen being produced. This procedure, however, was subject to the marked disadvantage that on dilution a pronounced odor of organic substances was noticeable even though ordinary methods of analysis failed to reveal the presence of organic impurities. As a result of this disadvantage it was heretofore impossible to interchange for general trade purposes, hydrochloric acid produced from organic reactions with that produced from inorganic reactions, unless the former was first subjected to additional tedious and expensive treatment. For example, it has been proposed to contact hydrogen chloride from organic chlorinations with active carbon in order to remove traces of impurities therefrom.

It is an object of this invention to provide a method whereby hydrogen chloride from organic reactions including esterifications, and more particularly hydrogen chloride from organic chlorinations may be used in the manufacture of hydrochloric acid free from the odor of organic substances, and indistinguishable in that respect from acid produced by inorganic processes. A further object is to remove organic impurities from hydrogen chloride by a process which is both simple and efficient. A still further object is to use the heat of absorption of hydrochloric acid in an absorbing medium in removing said impurities. Additional objects will become apparent from a consideration of the following description.

These objects are attained according to the process of the present invention which in its preferred embodiment comprises absorbing hydrogen chloride, evolved in organic reactions, in water maintained at temperatures sufficiently elevated to permit the evaporation of substantial amounts of water therefrom. This may be advantageously accomplished by supplying water to the absorption tower at a temperature approximating its boiling point.

The operation of my improved process is based on the principle that hydrogen chloride and water form a constant boiling mixture with a boiling point of 110° C. (at 760 mm. pressure) and a concentration of about 20% HCl. In the present invention I make use of this property, and prepare such a solution in an absorbing tower, boiling it freely so that steam passes on up through the tower, carrying the organic impurities with it.

The annexed drawing illustrates the arrangement of the apparatus and flow of materials in the practical application of my process.

In the practical application of this process the evolved hydrogen chloride is passed counter-current to a flow of water in a tower, preferably insulated to avoid undue loss of heat. The water may be preheated to approximately its boiling point, (say, to between about 71 and 100° C.) the additional heat necessary to evaporate the required amount of water being furnished in part by the heat of absorption of hydrogen chloride in water. Additional heat which may be necessary, particularly in insufficiently insulated towers, may be supplied by the simultaneous introduction of steam with the hydrogen chloride. The absorbing medium may be at least partially preheated by passing it in heat interchange relation with the steam evolved in the absorption process. Likewise, the acid solution produced may be passed in heat interchange relation with the absorption medium, in order to utilize the excess heat contained therein. It is, of course, understood that the amount of water passed into the absorption system is adjusted with respect to the amount of hydrogen chloride, the temperature and the heat loss of the system. Since the amount of heat evolved by the absorption of hydrogen chloride in water is considerable, due attention should be given to this factor in determining the amount of water to be used.

Exceptionally satisfactory results have been obtained by so regulating conditions that an acid solution containing approximately 20 per cent hydrochloric acid is produced. A solution of this concentration may advantageously be obtained by adjusting conditions in such a manner that the acid solution is produced at a temperature of about 110° C.

The acid solution from the absorption system may be further treated with steam or other treating agents if desired. However this is in general unnecessary since it has been found that the product produced according to the aforementioned instructions is quite free from organic odors. This acid solution may then be substituted for that from inorganic processes or used in conjunction therewith without imparting any objectionable characteristics to the product.

Upon removing the acid solution from the absorption system it is cooled, cooling being advantageously accomplished as previously mentioned by passing it in heat exchange relation with the absorbing medium. After cooling the acid solution may, if desired, be strengthened in the customary manner. For example it may be passed into an ordinary absorption system wherein it is contacted with hydrogen chloride from an inorganic source. By means of the aforementioned method of concentrating the acid solution a product having any desired strength, for instance 28 per cent or 36 per cent hydrochloric acid, may be produced.

It is understood that while the aforementioned instructions were given with respect to hydrogen chloride evolved in the chlorination of hydrocarbons the present invention is not limited thereto. This invention is intended to include within its scope the purification of hydrogen chloride evolved in organic reactions generally. For example, hydrogen chloride evolved in esterification reactions, an illustration of which is the production of ethyl-chloride from ethyl-alcohol and hydrochloric acid. As previously mentioned, the process is particularly adapted to the purification of hydrogen chloride evolved in reactions wherein chlorine is added to hydrocarbons either by direct chlorination or by interaction of the compound to be chlorinated with a compound containing chlorine.

As is apparent from a consideration of the previous description, the phrase "hydrogen chloride evolved in organic reactions" is intended to include hydrogen chloride produced as a result of the organic reactions and hydrogen chloride which has been added to aid in the organic reactions.

The present process provides a simple and surprisingly efficacious method of removing undesirable organic impurities from hydrogen chloride. By means of this discovery it is possible to produce hydrochloric acid from organic sources which compares favorably with that from inorganic sources. The product is free from undesirable organic odors and may be used interchangeably with or in admixture with acids from inorganic sources.

As many apparently widely different embodiments of this invention may be made without departing from the spirit and scope thereof, it is to be understood that the invention is not limited to the specific embodiments thereof except as defined in the appended claims.

As an example of the manner in which my process may be applied, I shall illustrate its application to the recovery of hydrochloric acid obtained in the chlorination of benzene. Reference is made to the annexed drawing.

In the chlorinator 1, benzene is converted into chloro-benzene by the aid of chlorine gas fed in through a suitable pipe 2. The gaseous by-product of the reaction, which consists of a mixture of hydrochloric acid gas, benzene vapors and some air originally entrapped with the chlorine, passes through a pipe 3 into a packed absorption tower 4. At the top of the tower, as at 5, a spray of water is entered, which has been preheated, preferably, in a heat-exchanger 6. If desired, steam may also be entered through the pipe 9, to assist in maintaining the contents of the tower at the boiling point.

The water trickles through the packing, absorbs most of the hydrochloric acid, and passes out at the bottom of the tower, as at 8, into a suitable container. In this process heat is generated, raising the temperature of the aqueous-hydrochloric acid solution to about 110° C., which corresponds to the constant-boiling temperature of this binary system. Part of the water evaporates, and passes out at the top of the tower through the outlet 7, carrying with it the benzene vapors, a small proportion of hydrochloric acid, and whatever air was present in the initial gaseous mixture. This escaping gas mixture is preferably conducted through the heat exchanger 6, where it preheats the incoming water, condenses, and passes out at the bottom. The non-condensible portion escapes through a suitable vent (not shown) into the atmosphere.

The loss of HCl by evaporation is relatively small. In an actual test run wherein 325 parts of hydrochloric acid were passed over from the chlorinator, 52 parts were lost by evaporation, while the rest was recovered at the bottom of the tower in the form of an aqueous solution of 19.8% strength and entirely free of organic smell. In this operation 1200 parts of water and 640 parts of steam were utilized. The water entered at a temperature of 71° C.; the steam, at a temperature of 160° C. The gases escaping from the top of the tower measures 102° C., while the acid solution flowing out at the bottom read at 103° C.

I claim:

1. A process for removing volatile impurities from hydrogen chloride evolved in organic reactions, which comprises feeding said hydrogen chloride continuously into an absorption tower containing water preheated to between about 71 and 100° C., whereby to form an aqueous hydrochloric acid solution of about 20% strength in said tower, maintaining said solution in a state of ebullition at a temperature between 100 and 110° C., whereby to remove continuously a mixture of steam, hydrochloric acid, non-condensible gases, and volatile impurities, feeding into the tower continuously further amounts of water and heat, and withdrawing aqueous-hydrochloric acid solution from the bottom of the tower.

2. A process for removing volatile impurities from hydrogen chloride evolved in organic reactions, which comprises feeding said hydrogen chloride continuously into an absorption tower containing warm water whereby to form an aqueous hydrochloric acid solution of about 20% strength in said tower, maintaining said solution in a state of ebullition at a temperature between 100 and 110° C., whereby to remove continuously a mixture of steam, hydrochloric acid, non-condensible gases, and volatile impurities, feeding into the tower continuously further amounts of water, and withdrawing aqueous-hydrochloric acid solution from the bottom of the tower.

JOHN PHILIP BAXTER.